(12) United States Patent
McCormick et al.

(10) Patent No.: US 8,256,608 B2
(45) Date of Patent: Sep. 4, 2012

(54) CONVEYOR BELT WITH ARTICULATING MEMBERS

(75) Inventors: Stephen A. McCormick, Warrington, PA (US); Simon Shamoun, Acworth, GA (US)

(73) Assignee: Linde Aktiengesellschaft, Munich (DE)

( * ) Notice: Subject to any disclaimer, the term of this patent is extended or adjusted under 35 U.S.C. 154(b) by 166 days.

(21) Appl. No.: 12/861,102

(22) Filed: Aug. 23, 2010

(65) Prior Publication Data

US 2012/0043187 A1      Feb. 23, 2012

(51) Int. Cl.
*B65G 13/10*      (2006.01)
(52) U.S. Cl. ............... 198/861.1; 198/782; 198/801
(58) Field of Classification Search ........... 198/782, 198/801, 802, 860.1, 861.1, 861.2; 193/35 R, 193/37
See application file for complete search history.

(56) References Cited

U.S. PATENT DOCUMENTS

| 2,215,231 | A | * | 9/1940 | Redshaw | 65/193 |
| 3,113,874 | A | * | 12/1963 | Baush et al. | 53/442 |
| 3,394,822 | A | * | 7/1968 | Bethke | 198/529 |
| 3,447,668 | A | * | 6/1969 | Jernigan | 198/834 |
| 5,009,057 | A | * | 4/1991 | Wilkinson | 53/439 |
| 5,042,633 | A | * | 8/1991 | Jenkner | 193/35 SS |
| 5,918,653 | A | * | 7/1999 | Knerr | 144/404 |
| 7,328,786 | B2 | * | 2/2008 | Anderson et al. | 198/782 |
| 7,380,653 | B2 | * | 6/2008 | Anderson et al. | 198/782 |
| 7,588,135 | B1 | * | 9/2009 | Chuang | 193/35 R |
| 7,802,675 | B2 | * | 9/2010 | Hall | 198/848 |

* cited by examiner

*Primary Examiner* — Douglas Hess
(74) *Attorney, Agent, or Firm* — Joshua L. Cohen

(57) ABSTRACT

A conveyor belt includes a conveying surface comprising a plurality of rod-shaped members each of which is constructed and arranged for vertical displacement with respect to each other for providing a space between adjacent ones of the plurality of rod-like members. The conveyor belt may also include a side link disposed at opposed ends of each one of the plurality of rod-shaped members, each one of the side links having at least one central aperture therein for receiving a corresponding end of the rod-shaped member for vertical displacement therein.

7 Claims, 5 Drawing Sheets ns reference may be had to the following drawing figures taken in conjunction with the description of the embodiments, of which:

CONVEYOR BELT WITH ARTICULATING MEMBERS

BACKGROUND

The present embodiments relate to conveyor belts used for transporting products, such as food products, for processing. Known conveyor belts have surfaces upon which products, such as food products, are disposed which permit portions of the food product to become trapped on surfaces of the belt, thereby leading to contaminant material between and among belt sections which is difficult to remove during known cleaning evolutions. In addition, even for those products which do not shed any of their mass, repetitive use of the belt usually leads to contaminant material and other unwanted particular matter becoming caught in the conveyor belt surface or support structure therefor. This is especially so for belts moving individual quick frozen (IQF) food products being displaced from the belt surface, i.e. bounced around upon the belt surface, such that portions of dislodged food product may become trapped in the conveyor belt.

BRIEF DESCRIPTION OF THE DRAWINGS

For a more complete understanding of the present embodiments, reference may be had to the following drawing figures taken in conjunction with the description of the embodiments, of which.

DESCRIPTION OF THE INVENTION

The present conveyor belt embodiments may be fabricated from stainless steel, as they are meant for use with a dry or relatively dryer product, as opposed to a moist or wet product. The conveyor belt surface may also be formed of stainless steel. The present embodiments increase the belt loading per unit area of the individual products, such as food products, moving freely across the conveyor belt surface and minimize clumping of product pieces during the freezing process without the need for an additional drive system for actuation to articulate the belt. In addition, sanitation of the conveyor belt embodiments is improved by providing for displacement or movement of members of the conveyor belt embodiment, which increases the space between adjacent articulated and stationary members. The agitation produced for the belt consumes a relatively low amount of energy without sacrificing freezing capacity.

The present conveyor belt embodiments permit movement of a section of a belt surface with respect to adjacent sections of the belt surface, which in turn provides for movement of the product along the belt surface and effective cleaning of the belt. The belt surface may be displaced, and such displacement also displaces the food product on the belt surface, such that adjacent food product does not contact each other, which avoids unacceptable "clumping" of the individual food products on the belt.

Figure 1:
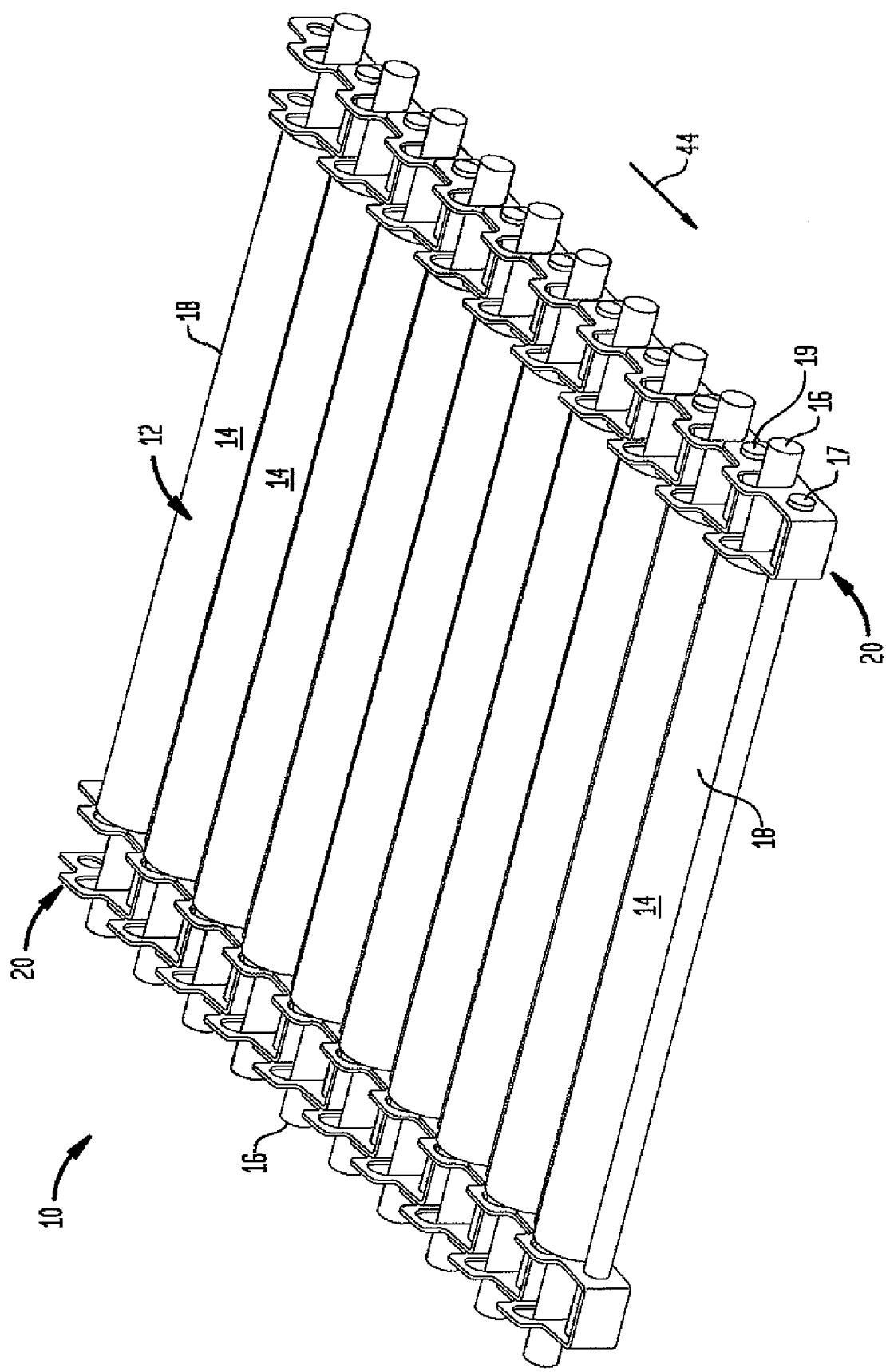
FIG. 1 shows a top perspective view of a conveyor belt of the present embodiment in a conveying mode.

Referring to FIG. 1, there is shown a portion of a conveyor belt embodiment 10 which transports products (not shown) such as for example food products. The conveyor belt surface 12 (for the sake of brevity referred to as the "conveyor surface 12") consists of a plurality of longitudinal members 14 as product support surfaces (each one for the sake of brevity referred to as a "support members 14"). Each of the support members 14 may be manufactured from plastic material or stainless steel. Each support member 14 is constructed as a longitudinal member supported upon a pin 16 which extends through or underneath the support member 14. By way of example only, the support members 14 shown have a circular cross-section, but other shapes may be employed. For the support members 14 shown each has an exterior surface 18 which abuts a surface of adjacent rods 17,19 or pins. The rods 17,19 may be formed from stainless steel. The support members 14 when disposed adjacent to the rods 17, 19 provide the conveyor surface 12. The rods 17, 19 transmit the driving force to move the conveyor belt 10.

Figure 2:
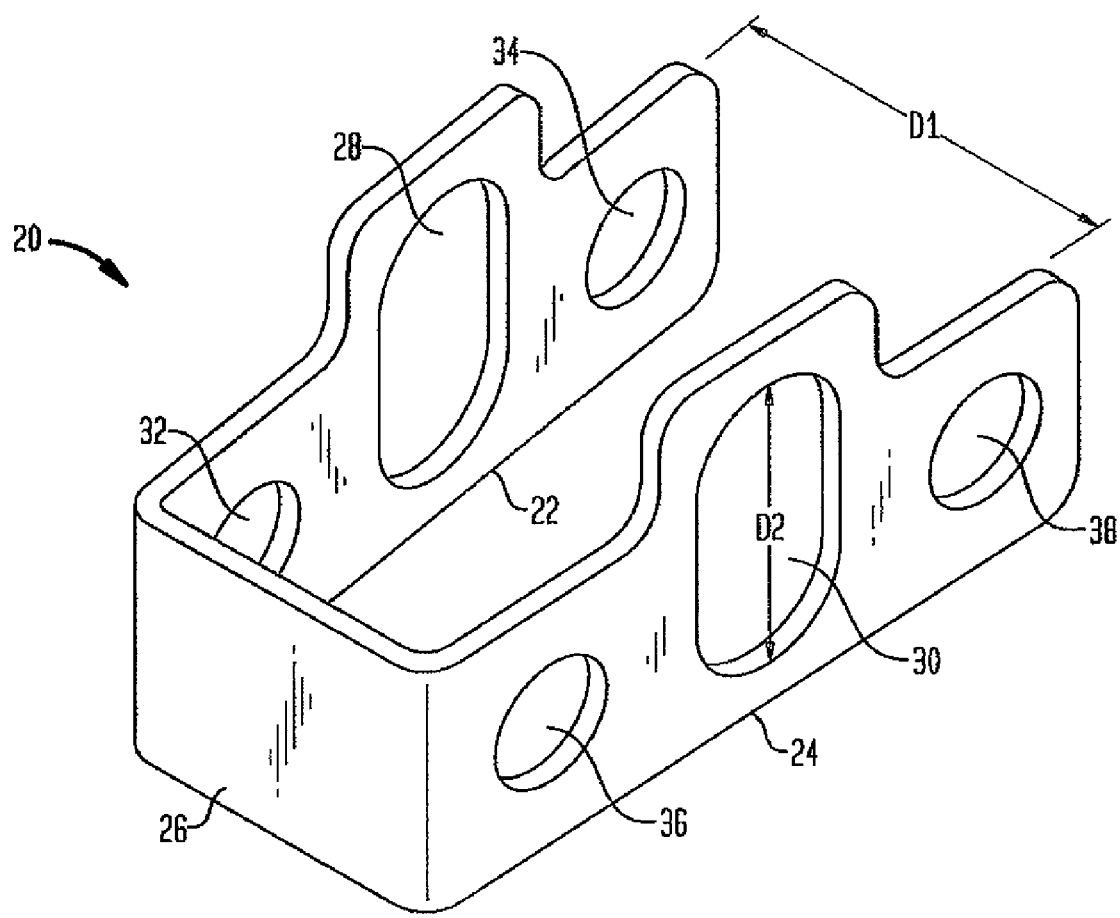
FIG. 2 shows a perspective view of a side link component of the conveyor belt embodiment of FIG. 1.
Figure 3:
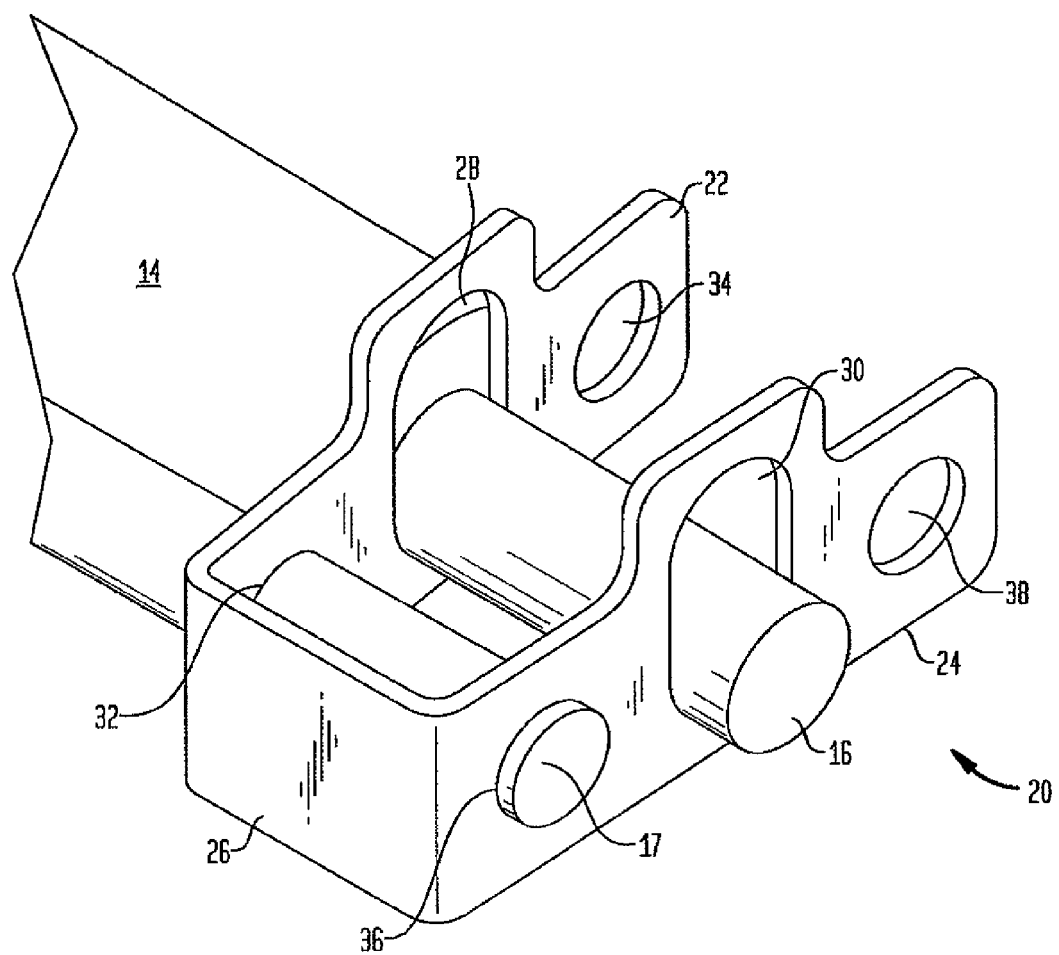
FIG. 3 shows a perspective view of a portion of the conveyor belt embodiment of FIG. 1.

Referring also to FIGS. 2 and 3, a side link 20 as shown is U-shaped and constructed to coact with adjacent side links 20 for actuation of the conveyor belt 10 during conveying and cleaning modes. Each side link 20 includes a pair of arms 22, 24 interconnected by a base portion 26. Each one of the arms 22, 24 is provided with a corresponding oblong-shaped central aperture 28, 30, respectively. The central apertures 28, 30 may be arranged in their respective arms 22, 24 as shown or angled from the vertical through 90% for example. A pair of holes 32, 34 are each disposed at an opposed side of the central aperture 28, while a pair of holes 36, 38 are each disposed at opposed side of the central aperture 30. The holes 32, 34, 36, 38 (collectively "32-38") may be circular in shape. The central apertures 28, 30 are constructed and arranged to receive a corresponding one of the pins 16. The side link 20 is constructed from steel or other alloy.

Distance "D1" represents a distance of the space between the arms 22, 24. The distance D1 is sufficient to permit the base portion 26 and corresponding arms 22, 24 of an adjacent side link 20 to be received into the space between the arms 22, 24 of the side links 20. For example, referring to FIGS. 2 and 3, it is shown how the base portion 26 of a side link 20 can be received between the arms 22, 24 of an adjacent side link 20 such that the holes 32, 36 of one of the side links 20 come into registration with the holes 34, 38 of the adjacent side link.

Distance "D2" represents a height of each one of the central apertures 28, 30. Such a distance D2 is representative of the path of travel that the pin 16 can move within the central apertures 28, 30. If the central apertures 28, 30 are arranged in their respective arms 22, 24 such that they are angled, such angling of the central apertures 28, 30 will permit the corresponding pin 16 moving therein to be angularly displaced with respect to the side link 20 and other ones of the support members 14.

Still referring also to FIGS. 2 and 3, each one of the side links 20 receives the corresponding pair of rods 17, 19. The rods 17, 19 may be manufactured from steel and each extends through apertures 32, 36 and 34, 38 of one of the corresponding side links 20. The rods 17, 19 or pins extend at either side of the support members 14 to coact with same during the conveying mode. Accordingly, while the plurality of side links 20 at each side of the conveyor belt 10 are connected to each other by the pins 17, 19, each one of the support members 14 can be individually displaced vertically with respect to adjacent and other ones of the support members 14 because the pin 16 has freedom of movement to be displaced in the central apertures 28, 30 and therefore, the conveyor belt surface 12 can be displaced as well. The rods 17,19 are arranged as a pair with the support member 14 disposed between the pair of rods 17,19.

As shown in FIG. 1, the arrangement of the side links 20 is at opposed sides of the conveyor belt 10. It can be seen then, that selective displacement of the pins 16 can result in selective displacement of the support members 14 to provide for a vibratory or articulating conveyor surface 12, if required, during movement of the conveyor belt 10.

An underlying surface of the support members 14 is constructed with a beveled or contoured portion for receiving a corresponding portion of one of the pins 16. Alternatively, a pin 16 may extend through an interior of a corresponding one of the support members 14.

Figure 4:
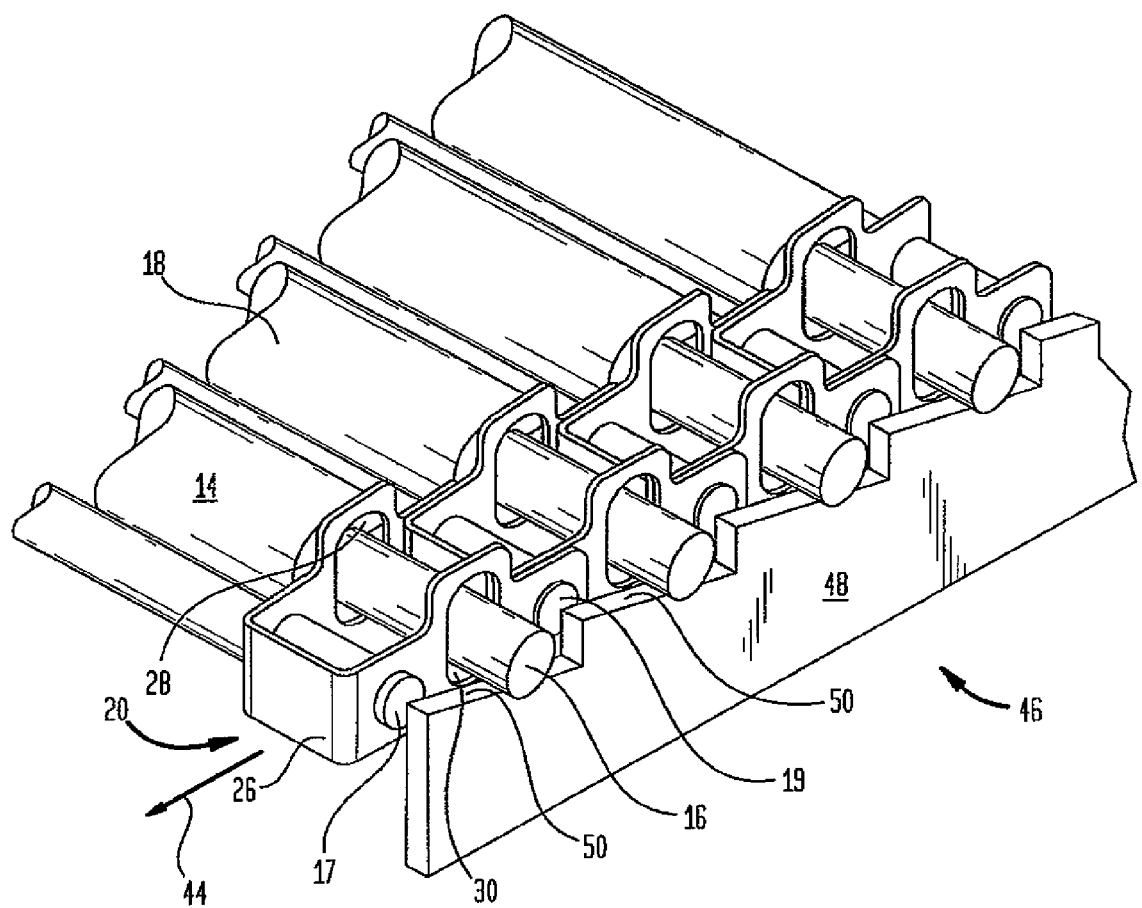
FIG. 4 shows a perspective view of a portion of the conveyor belt embodiment and an assembly by which the conveyor belt embodiment is articulated.
Figure 5:
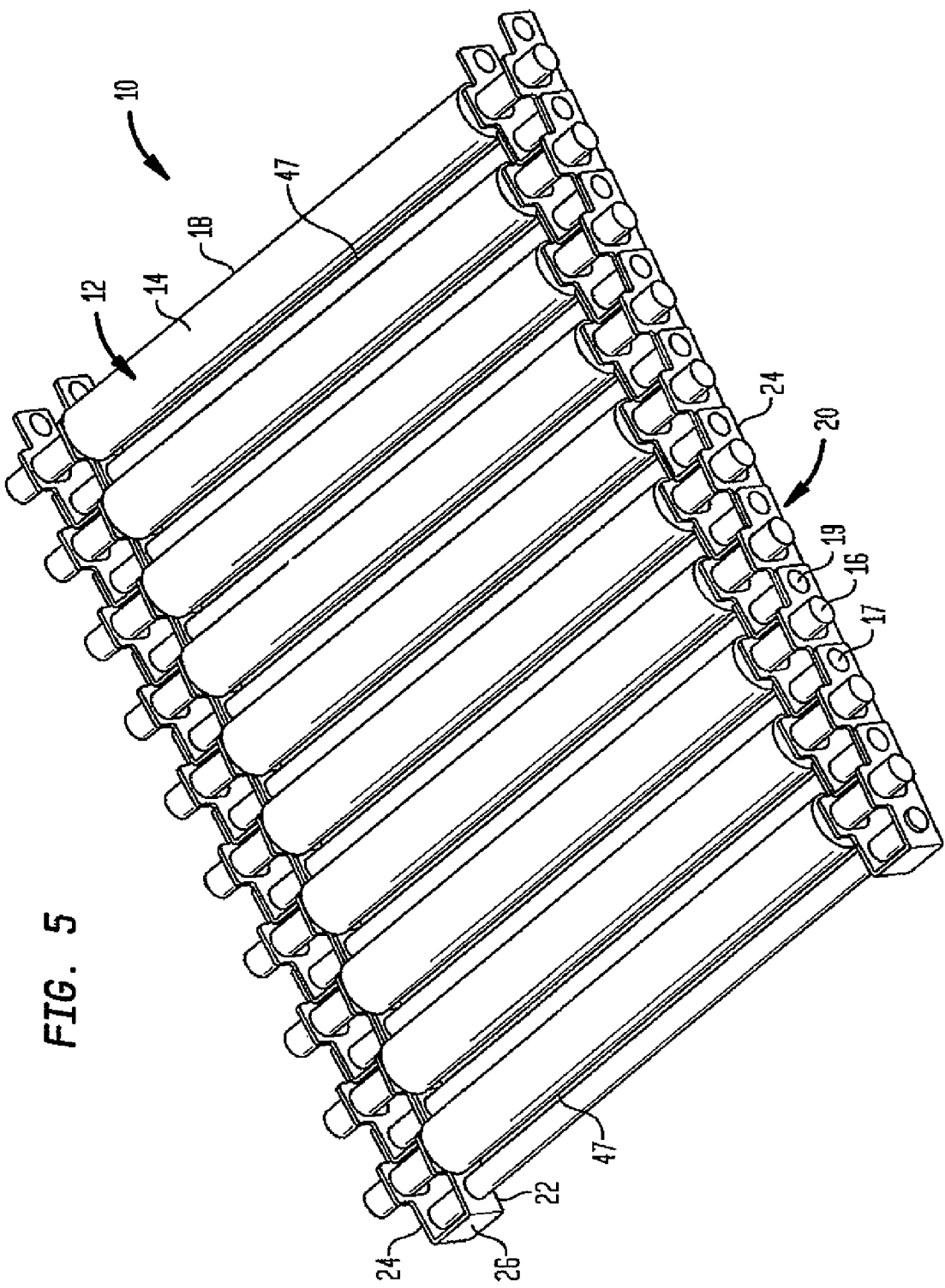
FIG. 5 shows a top perspective view of the conveyor belt embodiment disposed for a cleaning mode.

Referring to FIGS. 4 and 5, a device 46 or assembly is used to trip or actuate the pins 16 such that they become or remain displaced in their corresponding central apertures 28, 30 so that the exterior surface 18 of each adjacent support member 14 becomes or remains spaced apart from one another to thereby provide spacing 47 shown generally between adjacent support members 14. Such spacing 47, as further discussed with respect to FIG. 5, facilitates cleaning the support members of any extraneous food product or contaminate material. The spacing 47 also promotes subsequent drying after rinsing or washing of the support members 14 during the conveyor belt 10 return run to retrieve subsequent food product.

In FIGS. 1 and 4 the conveyor belt 10 is moving in the direction of arrow 44. As shown in FIG. 4, the device 46 includes another longitudinal member 48 disposed at at least one side of the conveyor belt 10, and having a plurality of spaced stepped portions 50. Each one of the stepped portions 50 is graded or angled slightly upward in the direction 44 of movement of the conveyor belt 10. As can be seen from FIG. 4, movement of the pins 16 along each one of the successive stepped portions 50 causes each one of the pins to become elevated, thereby elevating its corresponding support member 14 along a different plane of travel, until the pin 16 reaches the end of the step at which point it drops on to the next adjacent stepped portion 50 thereto. Accordingly, the stepped portions 50 can all be uniform in size and shape to provide for a uniform articulation or undulation or alternatively, the stepped portions 50 can be grouped with different grades/angles and lengths at different positions along the longitudinal member 48 to provide for varied articulation or undulation of the support members 14 and hence the conveyor belt 10.

A rack or guide disposed adjacent to the conveyor belt embodiment 10 can be used to contact those of the pins 16 that "stick" in an elevated position to force the pins 16 downward with respect to the side links 20.

Referring to FIG. 5, the conveyor surface 12 is shown with the exterior surface 18 of support members 14 being displaced away from the rods 17, 19 disposed at opposed sides of the support members 14. Such arrangement of the support members 14 could be as a result of using the device 46 and stopping the movement 44 of the conveyor belt 10 when the pins 16 have reached the uppermost height of the graded stepped portions 50. The device 46 would be most frequently used to coact with the pins 16 along an upper tier of the conveyor belt 10, as opposed to being used along a lower or return tier of the conveyor belt 10. The spacing 47 can be clearly seen which will facilitate cleaning of the support members 14 and the rods 17,19, in addition to other elements of the conveyor belt 10. The spacing 47 is intermittently provided by the displacement of the support members 14, which also facilitates drying of the conveyor belt 10 components after rinsing or wash down of same.

As the conveyor belt 10 transitions around a sprocket or wheel (not shown) to execute a turn, the pins 16 are displaced under the effect of gravity in the central apertures 28, 30 of the side links 20 to facilitate spacing between and among the support members 14 during the turn. The product, such as a food product, can be removed under the effect of gravity from the conveyor surface 12 for further processing prior to for example packaging.

Each one of the support members 14 can articulate at different intervals from that of adjacent support members by applying force to either the individual support member 14 or the pin 16. The side links 20 and the rods 17, 19 drive and support the support members 14. The rods 17,19 remain in position upon vertical displacement of the support member 14. The plurality of the rod-shaped members 14 and each of the pair of pins 17,19 disposed at opposed sides thereof coact to form the conveying surface with a continuous surface area when the plurality of rod-shaped members are not displaced.

Each one of the support members 14 may also be constructed for rotation about its longitudinal axis, such that opposed ends of the support member can rotate in the central apertures 28,30.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A conveyor belt, comprising:
a conveying surface comprising:
a plurality of rod-shaped members each of which is constructed and arranged for vertical displacement with respect to each other for providing a space between adjacent ones of the plurality of rod-shaped members, and
a pair of pins disposed at opposed sides of each one of the plurality of rod-shaped members, the pair of pins constructed and arranged to remain in position upon vertical displacement of the rod-shaped members,
wherein each one of the plurality of rod-shaped members and the pair of pins disposed at opposed sides of each rod-shaped member coact to form the conveying surface with a continuous surface area when the plurality of rod-shaped members are not displaced.

2. The conveyor belt of claim 1, wherein each one of the plurality of rod-shaped members comprises a cross-section having a circular shape.

3. The conveyor belt of claim 1, further comprising a side link disposed at opposed ends of each one of the plurality of rod-shaped members, each one of the side links having at least one central aperture therein for receiving a corresponding end of the rod-shaped member for vertical displacement therein.

4. The conveyor belt of claim 3, wherein the at least one central aperture is oblong-shaped.

5. The conveyor belt of claim 3, further comprising a device disposed adjacent the plurality of rod-shaped members for deflecting each one of the plurality of rod-shaped members along different planes of travel such that the rod-shaped members are each displaced in the central aperture of the side link corresponding to a particular rod-shaped member to provide an articulating motion of the conveying surface.

6. The conveyor belt of claim 1, wherein the plurality of rod-shaped members are manufactured from a material selected from stainless steel and plastic.

7. The conveyor belt of claim 1, wherein each one of the plurality of rod-shaped members is rotatable about its corresponding longitudinal axis.

* * * * *